(12) United States Patent
Yang et al.

(10) Patent No.: US 12,222,125 B2
(45) Date of Patent: Feb. 11, 2025

(54) AIR PURIFIER AND ITS AIR PURIFICATION METHOD

(71) Applicant: Shenzhen Chenbei Technology Co., Ltd., Shenzhen (CN)

(72) Inventors: Lin Yang, Shenzhen (CN); Hai Yang, Shenzhen (CN)

( * ) Notice: Subject to any disclaimer, the term of this patent is extended or adjusted under 35 U.S.C. 154(b) by 633 days.

(21) Appl. No.: 16/726,774

(22) Filed: Dec. 24, 2019

(65) Prior Publication Data
US 2020/0200407 A1 Jun. 25, 2020

(30) Foreign Application Priority Data
Dec. 24, 2018 (CN) .......................... 201811582241.6

(51) Int. Cl.
| F24F 11/62 | (2018.01) |
| F24F 8/10 | (2021.01) |
| F24F 11/30 | (2018.01) |
| F24F 11/65 | (2018.01) |
| F24F 110/50 | (2018.01) |

(52) U.S. Cl.
CPC ............... *F24F 11/65* (2018.01); *F24F 8/10* (2021.01); *F24F 11/30* (2018.01); *F24F 11/62* (2018.01); *F24F 2110/50* (2018.01)

(58) Field of Classification Search
CPC .... F24F 8/10; F24F 11/30; F24F 11/62; F24F 2110/50; F24F 11/65; F24F 3/16; F24F 2221/18; F24F 2221/42; F24F 11/63; F24F 11/64; Y02B 30/70
See application file for complete search history.

(56) References Cited

U.S. PATENT DOCUMENTS

2005/0279059 A1* 12/2005 Lee .................. B01D 46/46
                                                          55/356
2014/0342670 A1* 11/2014 Kang .................. H04L 69/14
                                                          455/67.11
(Continued)

FOREIGN PATENT DOCUMENTS

| CN | 103629751 A | * | 3/2014 |
| CN | 10697177 A | * | 8/2017 |
| JP | H0226688 A | * | 1/1990 |

OTHER PUBLICATIONS

Tang, Methods for Controlling Air Cleaning Robot System or Self-Moving Robot System, Aug. 1, 2017, CN106997177A, Whole Document (Year: 2017).*

(Continued)

*Primary Examiner* — Larry L Furdge
(74) *Attorney, Agent, or Firm* — Tsz Lung Yeung

(57) ABSTRACT

An air purification method includes the steps of acquiring air quality data within the air purifying area, determining whether the air quality data falls within a predetermined threshold range, determining an operation mode of the air purifier by a ratio between an area size of the air purifying area and a coverage area of the air purifier when the acquired air quality data is not fall within the threshold range, and controlling the air purifier at the operation mode thereof to purify air within the air purifying area. The operation mode of the air purifier is determined according to a ratio between an area size of the air purifying area and a coverage area of the air purifier.

6 Claims, 4 Drawing Sheets

(56) References Cited

U.S. PATENT DOCUMENTS

2016/0100733 A1* 4/2016 Kim .................. A47L 9/2805
                                                    15/319
2018/0296050 A1* 10/2018 Karakaya ............... G01N 15/06

OTHER PUBLICATIONS

Eiji et al., Cleaning Robot, Jan. 29, 1990, JPH0226688A, Whole Document (Year: 1990).*
Chang et al., Air Purifying Device and Air Purifying Method, Mar. 12, 2014, CN103629751A, Whole Document (Year: 2014).*

* cited by examiner

AIR PURIFIER AND ITS AIR PURIFICATION METHOD

BACKGROUND OF THE PRESENT INVENTION

Field of Invention

The present invention relates to a field of air purification, and more particularly to an air purifier and its air purification method, which is implemented with computer-readable storage medium.

Description of Related Arts

The rapid development of economy is often burdensome to the environment. Poor air quality not only affects people's physical health, but also affects their mental health. People are seeking many meaningful solutions in order to improve environmental air quality in homes and commercial buildings, wherein various types of air purifiers have been developed and promoted.

In order to increase am air input purification efficiency of the air purifier, a diameter size of a fan blade can be enlarged or a rotational speed of the fan blade can be increased for drawing air into the air purifier. However, the overall size of the air purifier will be significantly increased when the diameter size of a fan blade is enlarged, and the power consumption of the air purifier will be significantly increased when the rotational speed of the fan blade can be increased.

Therefore, it is necessary to provide a novel technical solution to solve the above problems.

SUMMARY OF THE PRESENT INVENTION

Certain variations of the present invention provide an air purification method via an air purifier, which is able to increase the air purification output ratio without significantly increasing the overall cost of the air purifier.

In one aspect of the present invention, it provides an air purification method via an air purifier, which comprises the steps:

(1) acquiring air quality data within an air purifying area;

(2) determining whether the air quality data falls within a predetermined threshold range, wherein the threshold range is preset in the air purifier;

(3) configuring an operation mode of the air purifier by determining a ratio between an area size of the air purifying area and a coverage area of the air purifier if the acquired air quality data is not fall within the threshold range; and (4) controlling the air purifier in response to the operation mode thereof to purify air within the air purifying area.

Another aspect of the present invention provides an air purifier which comprises a memory, a processor, and a computer program stored on the memory and executable on the processor, wherein the method in the first aspect is executed by the processor.

Another aspect of the present invention provides a computer-readable storage medium storing a computer program, wherein the computer program is implemented by a processor to implement the method in the first aspect.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Embodiment 1

Figure 1:
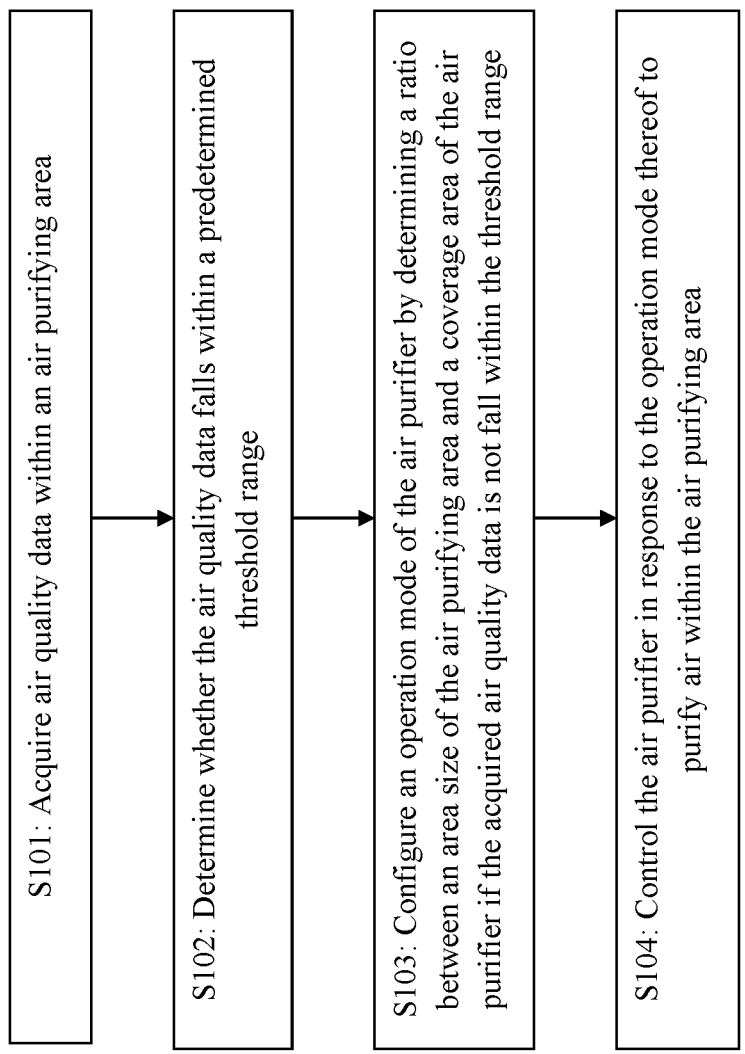
FIG. 1 is a flow diagram of an air purification method according to a first preferred embodiment of the present invention.

FIG. 1 shows a flow diagram of an air purification method according to a first embodiment of the present invention, wherein the air purification method may be implemented by an air purifier. The air purification method may comprise the following steps:

S101: Acquire air quality data within an air purifying area.

Accordingly, the air purifier, which is also known as an air cleaner or an air filter, is a system or device arranged for filtering out, absorbing, decomposing, or converting unwanted substances and/or air pollutants, such as harmful debris, dirt and contaminants, in the air when passing through the device, so as to effectively enhance the cleanliness of air. The air purifier is generally divided into a household type, a commercial type and an industrial type. The above mentioned air pollutants can be, but not limited to, PM2.5 (Fine Particulate Matter), dust, pollen, odors, formaldehyde, bacteria, and allergens. The air purifying area can be one or more rooms, but not limited to, including living rooms, bedrooms, study rooms, kitchens. The air quality data includes, but not limited to, the concentration of major pollutants in the air, such as the concentration of PM2.5.

In the first preferred embodiment of the present invention, the air quality data within the air purifying area may be obtained by an air quality detection sensor of the air purifier. The air purifying area may be defined as one or more sub-areas of a main purifying area.

The air purifier may comprise a communication module, such as a wireless communicator, arranged for connecting to an automated floor cleaner, such as an automated floor vacuum device, an automated floor mopping device, an automated floor cleaning device, or a robot vacuum, to acquire the air quality data therefrom. The automated floor vacuum device is taken as an example in the present invention. Accordingly, the air quality detection sensor can be built-in with the automated floor vacuum device, such that when the automated floor vacuum device is operated to move within the air purifying area, the air quality data will be collected and sent to the communication module. It is worth mentioning that the communication module can also link to a server, such as a local weather station, to acquire the air quality data therefrom. It is appreciated that the communication module is able to link to any air quality data provider in response to the air purifying area.

It should be understood that when the air quality data within the air purifying area is acquired by the communication module through interacting the server, the air quality detection sensor can be omitted in the air purifier, so as to save the cost thereof. However, the air quality data can be obtained by both the communication module and the air quality detection sensor.

In the first preferred embodiment of the present invention, the air quality data may be obtained at a time interval, such that multiple air quality data can be obtained. The air quality data will be averaged via a computerized unit of the air purifier to determine an average air quality data over a predetermined time. Alternatively, the air quality data can be obtained in a real time manner.

S102: Determine whether the air quality data falls within a predetermined threshold range via the computerized unit, wherein the threshold range is preset in the computerized unit of the air purifier.

In the first preferred embodiment, the threshold range may be preset corresponding to a range of an air pollution index.

The computerized unit may be arranged to determine whether the acquired air quality data is a preset value.

S103: Configure an operation mode of the air purifier by determining a ratio between an area size of the air purifying area and a coverage area of the air purifier if the acquired air quality data is not fall within the threshold range.

Accordingly, the coverage area of the air purifier may be manufacturer suggested coverage area covering the maximum indoor area for the air purifier. Generally, the coverage area of the air purifier can be calculated according to the CADR value (Clean Air Delivery Rate) of the air purifier.

The operation modes of the air purifier can be, but not limited to, a stationary purification mode and a mobile purification mode.

The stationary purification mode may refer to the air purifier stationary fixed at a certain location or a fixed point to complete the operation of air purification, wherein the air purifier is usually located in the center of a room without any obstacles around the air purifier. The mobile purification mode and the stationary purification mode are corresponding with each other, wherein the mobile purification mode refers to the air purifier continuously moving in the room to complete the operation of air purification.

S104: Control the air purifier in response to the operation mode thereof to purify air within the air purifying area.

It should be understood that if the operation mode of the air purifier is determined as the stationary purification mode, the air purifier may be controlled and operated to purify the air within the air purifying area by stationary locating the air purifier within the air purifying area. If the operation mode of the air purifier is determined as the mobile purification mode, the air purifier is controlled and operated to purify the air within the air purifying area by moving the air purifier within the air purifying area.

It is appreciated that according to the first embodiment of the present invention, the operation mode of the air purifier can be determined according to the ratio between the actual area size of the air purifying area and the coverage area of the air purifier. Therefore, without significantly increasing the manufacturing cost of the air purifier, the air purification output ratio is increased and the practical use of the air purifier is enhanced.

Embodiment 2

Figure 2:
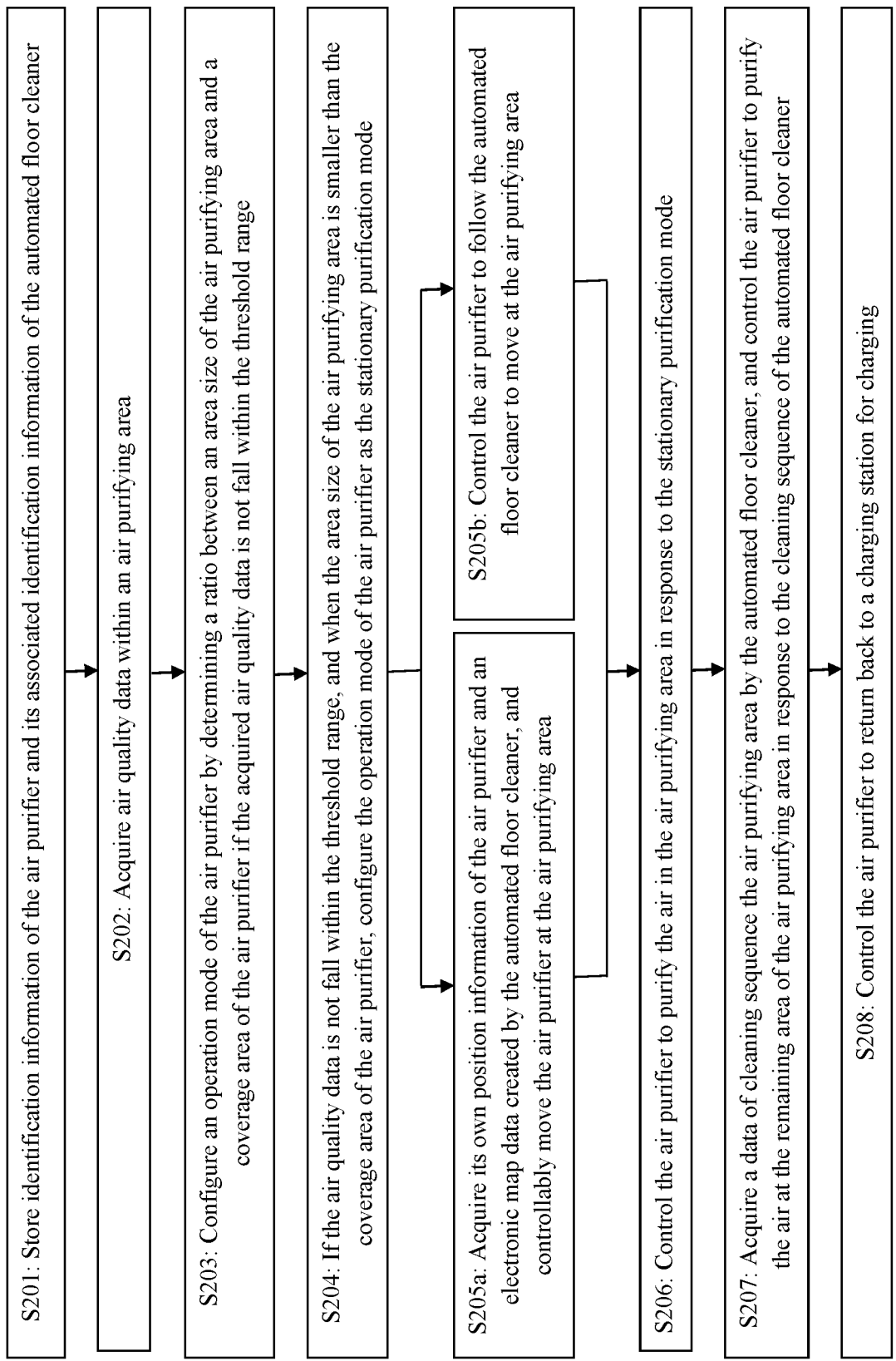
FIG. 2 is a flow diagram of an air purification method according to a second preferred embodiment as a first modification of the present invention.

FIG. 2 of the drawings shows a flow diagram of an air purification method according to a second embodiment of the present invention, wherein the method of the second embodiment is a modification of the first embodiment for further modifying the steps S103 and S104. According to the second embodiment, the air purification method may be implemented by an air purifier, wherein the air purification method comprises the following steps:

S201: Store identification information of the air purifier and its associated identification information of the automated floor vacuum device.

In one embodiment, through a mobile terminal of the present invention, the identification information of the air purifier and the identification information of at least one automated floor vacuum device are associated and are then stored, so as to communicatively connect the air purifier with the automated floor vacuum device. Accordingly, the identification information may include, but not limited to, machine codes or serial numbers of the air purifier and the automated floor vacuum device.

S202: Acquire air quality data within an air purifying area.

S203: Determine whether the air quality data falls within a predetermined threshold range via the computerized unit, wherein the threshold range is preset in the computerized unit of the air purifier.

It is worth mentioning that steps S202 and S203 of the second embodiment are the same as the steps S101 and S102 of the first embodiment respectively, wherein the detail descriptions for the steps S202 and S203 refer to the steps S101 and S102 and they will not be repeated herein.

S204: If the air quality data does not fall within the threshold range, and when the area size of the air purifying area is smaller than the coverage area of the air purifier, configure the operation mode of the air purifier as the stationary purification mode.

Accordingly, the operation modes of the air purifier can be configured as the stationary purification mode and the mobile purification mode.

The stationary purification mode may refer to the air purifier stationary fixed at a certain location or a fixed point to complete the operation of air purification, wherein the air purifier is usually located in the center of the air purifying area. The mobile purification mode refers to the air purifier continuously moving in the air purifying area to complete the operation of air purification.

It is worth mentioning that the second embodiment of the present invention illustrates the operation mode of the air purifier as the stationary purification mode as an example. The third embodiment of the present invention illustrates the operation mode of the air purifier as the mobile purification mode as another example.

It is worth mentioning that after the operation mode of the air purifier may be determined as the stationary purification mode, the method may further comprise at least one of the steps S205a and S205b to move the air purifier at the air purifying area.

S205a: Acquire its own position information of the air purifier and an electronic map data created by the automated floor vacuum device, and controllably move the air purifier at the air purifying area according to the position information of the air purifier and the electronic map data of the automated floor vacuum device.

The electronic map data of the automated floor vacuum device may be converted into an indoor air purifying map for the air purifying area.

In one embodiment, the electronic map data is an indoor environment map.

It should be understood that if the air purifier is not located within the air purifying area, the air purifier must move within the air purifying area for air purification. The air purifier comprises a positioning module to acquire its own position information in a real time manner, wherein the air purifier is automatically moved at the air purifying area in response to the position information and the electronic map data created by the automated floor vacuum device.

In one embodiment, the positioning module is an indoor positioning system.

S205b: Control the air purifier to follow the automated floor vacuum device to move at the air purifying area.

It should be understood that during the vacuuming operation of the automated floor vacuum device, the air purifier may be considered as one of the obstacles for the automated floor vacuum device, such that the automated floor vacuum device will move aside to avoid any collision of the air purifier. Therefore, when the air purifier does not equipped with the positioning module, the air purifier is able to acquire its own position information in a real time manner through the interaction and/or communicatively connection with the automated floor vacuum device. Then, based on the position information of the automated floor vacuum device and the position information of the air purifier, the air purifier is guided and controlled to follow the movement of the automated floor vacuum device to the air purifying area.

It should be understood that when the air purifier is set to follow the automated floor vacuum device to the air purifying area, the overall manufacturing cost of the air purifier can be further reduced because the air purifier does not equipped with the positioning module as an individual added-on component of the air purifier.

S206: Control the air purifier to purify the air in the air purifying area in response to the stationary purification mode.

In one embodiment, when the air purifier starts to purify the air in the air purifying area, the air quality data in the air purifying area will be acquired and collected in a real time manner or periodically. When the air quality in the air purifying area reaches a predetermined threshold, the air purifier is controlled to perform the steps S207 and S208.

S207: Acquire a data of cleaning sequence of the room in the air purifying area by the automated floor vacuum device, and control the air purifier to purify the air at the remaining area of the air purifying area in response to the cleaning sequence of the automated floor vacuum device.

Considered that in an actual situation, the air purifying area includes more than one room needed to be air purified. For a suite as an example, a living room and a bedroom are needed to be cleaned individually. Therefore, the air purifier is moved from one room to another room for completing the air purification at each room.

S208: Control the air purifier to return back to a charging station for charging.

In one embodiment, the air purifier and the charging station are communicated via an Infrared connection as an example. An infrared receiver is provided at the air purifier and an infrared transmitter is provided at the charging station, wherein the infrared receiver is arranged to receive an infrared signal sent from the transmitter in order to guide the air purifier finding the location of the charging station and returning back to the charging station.

In one embodiment, the current remaining electrical power of the air purifier is initially detected. When the electrical power is insufficient to complete the air purification operation or when the air purification operation has been already completed, the air purifier is controlled to return back to the charging station.

It should be understood that comparing to the first embodiment, the second embodiment of the present invention can complete the air purification within a particular small area by controlling the air purifier at the stationary purification mode, and can use one single air purifier to complete the air purification at different air purification areas. Therefore, the number of air purifiers can be reduced within the air purifying area to minimize the cost of the air purifier, so as to enhance the practical use of the air purifier.

Embodiment 3

Figure 3:
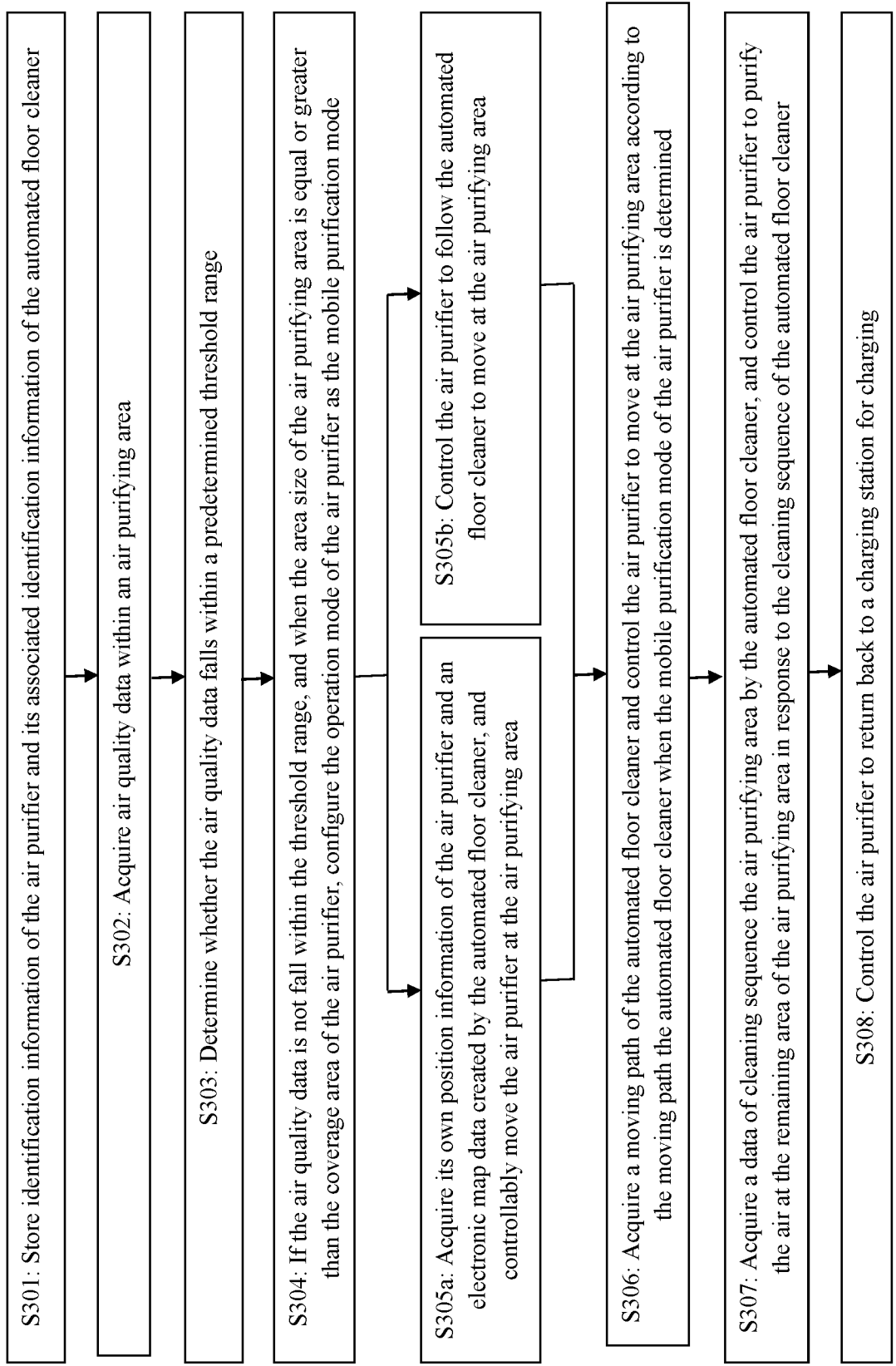
FIG. 3 is a flow diagram of an air purification method according to a third preferred embodiment as a second modification of the present invention.

FIG. 3 shows a flow diagram of an air purification method according to a third embodiment of the present invention, wherein the method of the third embodiment is a modification of the first embodiment for further modifying the steps S103 and S104. According to the third embodiment, the air purification method is implemented by an air purifier, wherein the air purification method comprises the following steps:

S301: Store identification information of the air purifier and its associated identification information of the automated floor vacuum device.

S302: Acquire air quality data within an air purifying area.

S303: Determine whether the air quality data falls within a predetermined threshold range via the computerized unit, wherein the threshold range is preset in the computerized unit of the air purifier.

S304: If the air quality data is not fall within the threshold range, and when the area size of the air purifying area is equal or greater than the coverage area of the air purifier, determine the operation mode of the air purifier as the mobile purification mode.

It is worth mentioning that after the operation mode of the air purifier is determined as the mobile purification mode, the air purifier is operated to perform at least one of the steps S305a and S305b to move the air purifier at the air purifying area.

S305a: Acquire its own position information of the air purifier and the electronic map data created by the automated floor vacuum device, and controllably move the air purifier at the air purifying area according to the position information of the air purifier and the electronic map data of the automated floor vacuum device.

S305b: Control the air purifier to follow the automated floor vacuum device to move at the air purifying area.

The above mentioned steps S301-S305 of the third embodiment are generally the same as the steps S201-S205 in the second embodiment, wherein the detail descriptions for the steps S301-S305 refer to the steps S201-S205 and they will not be repeated herein.

S306: Acquire a moving path, i.e. a vacuuming path or a cleaning path, of the automated floor vacuuming device and control the air purifier to move at the air purifying area according to the moving path the automated floor vacuum device when the mobile purification mode of the air purifier is determined.

In one embodiment, the moving path of the air purifier is defined as the moving path of the automated floor vacuum device when the mobile purification mode of the air purifier is determined.

In one embodiment, the moving path of the air purifier is planned and modified by the moving path of the automated floor vacuum device when the mobile purification mode of the air purifier is determined.

In one embodiment, when the air purifier starts to purify the air in the air purifying area, the air quality data in the air purifying area will be acquired and collected in a real time manner or periodically. When the air quality in the air purifying area reaches a predetermined threshold, the air purifier is controlled to perform the steps S307 and S308.

S307: Acquire a data of cleaning sequence of the room in the air purifying area by the automated floor vacuum device, and control the air purifier to purify the air at the remaining area of the air purifying area in response to the cleaning sequence of the automated floor vacuum device.

S308: Control the air purifier to return back to a charging station for charging.

The above mentioned steps S307-S308 of the third embodiment are generally the same as the steps S207-S208 in the second embodiment, wherein the detail descriptions for the steps S307-S308 refer to the steps S207-S208 and they will not be repeated herein.

It should be understood that comparing to the first embodiment, the third embodiment of the present invention is able to complete the air purification operation for a larger air purifying area by configuring the operation mode of the air purifier as the mobile purification mode and acquiring the moving path of the automated floor vacuum device. Thus, the air purification operation can be completed by one single air purifier in order to complete the air purification at different air purification areas. Therefore, the number of air purifiers can be reduced within the air purifying area to minimize the cost of the air purifier, so as to enhance the practical use of the air purifier.

Embodiment 4

Figure 4:
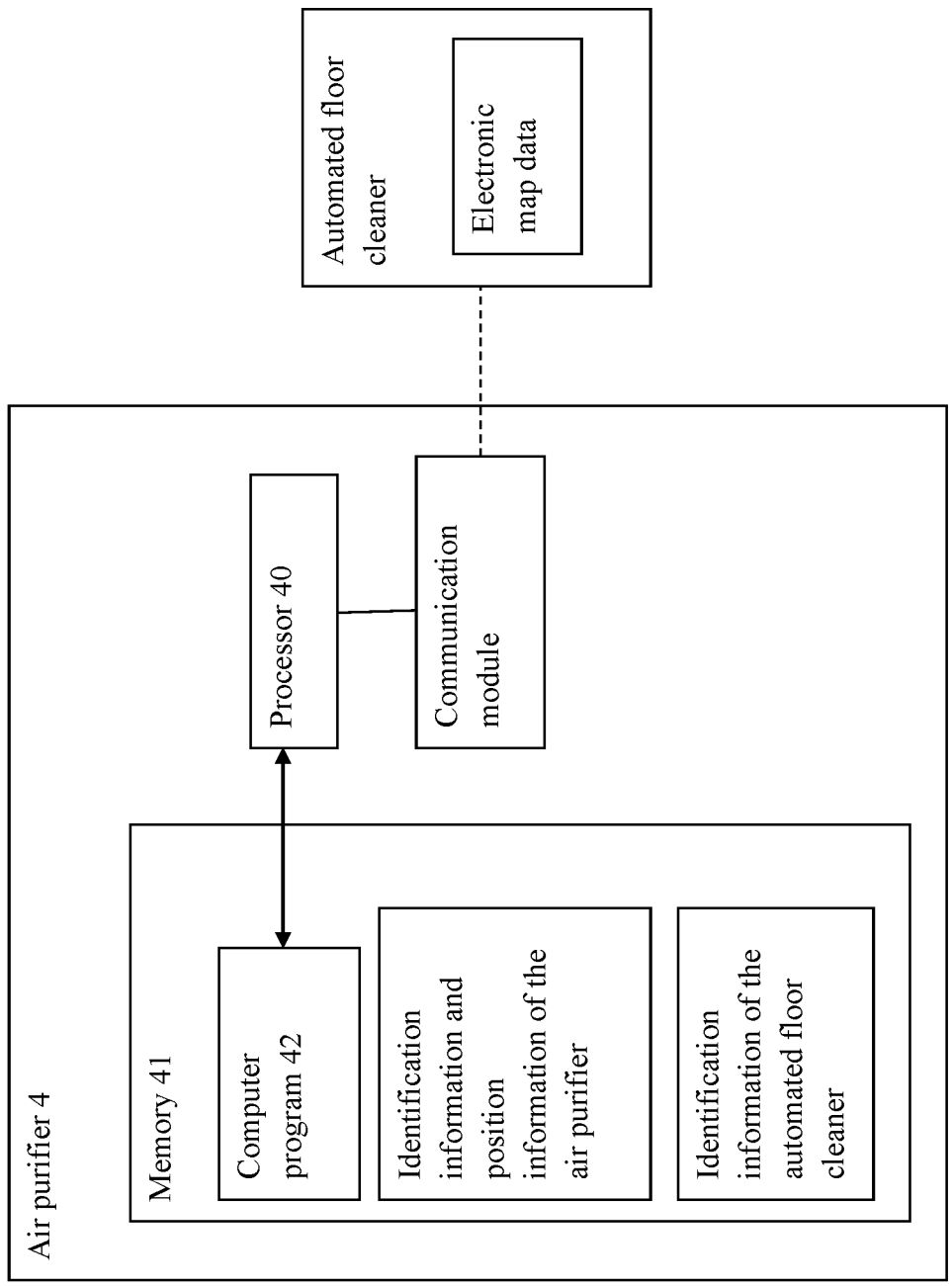
FIG. 4 is a block diagram of an air purifier according to the fourth preferred embodiment of the present invention.

FIG. 4 shows the air purifier for the above embodiments of the present invention. As shown in FIG. 4, the air purifier comprises a processor 40, a memory 41, and a computer program 42 stored in the memory 41 and executable on the processor 40. Accordingly, the computer program 42 is computer instructions to perform operations. When the computer program 42 is executed by the processor 40, the above steps in first to third embodiments are implemented. For example, the steps S101 to S104 in the first embodiment are executed via the processor 40. The steps S201 to S208 in the second embodiment are executed via the processor 40. The steps S301 to S308 in the third embodiment are executed via the processor 40.

The air purifier can be constructed to only have, but not limited to, the processor 40 and the memory 41. Those skilled in the art can understand that FIG. 4 is only an example of the air purifier 4, and it should not be limited for the air purifier 4. The air purifier can further construct to include more components as shown in the figure. For example, the air purifier may further include an input-output device, a network accessing module, a communication bus, and the like.

The processor 40 can be a central processing unit (Central Processing Unit, CPU), or other general-purpose processors, digital signal processors (DSPs), application specific integrated circuits (ASICs), Field-Programmable Gate Array (FPGA) or other programmable logic devices, discrete gate or transistor logic devices, discrete hardware components, etc. A general-purpose processor can be a microprocessor or any conventional processor or the like.

The memory 41 is configured as an internal storage unit of the air purifier 4, wherein the memory 41 can be a hard disk or a memory of the air purifier 4. The memory 41 can also be an external storage device of the air purifier 4, such as a plug-in hard disk, a smart media card (SMC), and a Secure Digital (SD) card, flash card, etc. Further, the memory 41 can be constructed to have both an internal storage unit and an external storage device of the air purifier 4. The memory 41 is configured to store the computer program 42 and other programs and data required by the air purifier, such as position information and electronic map data of the automated floor vacuum device. The memory 41 can also be configured to temporarily store data that has been output or is to be output.

A skilled person should clearly understand the structure of the present invention, wherein the specific operating processes of the systems, devices, and units described above can refer to the corresponding processes in the foregoing method embodiments, and they are not repeated herein.

In the above embodiments, the description of each embodiment has its own features, wherein each embodiment may not fully disclosed in detail for every single component and reference may be made to related descriptions of other embodiments.

A skilled person in the art may realize that the modules, units, and/or method steps of the embodiments disclosed herein can be implemented by electronic hardware, or a combination of computer software and electronic hardware. Whether these functions are performed in hardware or software depends on the specific application and design configuration. A skilled person in the art can use different methods to implement the above mentioned functions for each specific application and embodiment, but such implementation should not be considered to be beyond the scope of the present invention.

In the above embodiments, it should be understood that the systems, devices, and methods may be implemented in other ways. For example, the embodiments mentioned above are only schematic. For example, one unit can provide multiple logical functions. In actual implementation, multiple units provide multiple logical functions. For example, multiple units or components may be combined or integrated into another system, or some features can be ignored or not implemented. In addition, the mutual coupling can be a direct coupling or indirect coupling, the communication connection can be formed via some interfaces, devices or units, which may be electrical, mechanical or other forms.

The separate components can be separated physically or not, and the components can be physical units or not. That is, the component may be located in one place, or may be distributed on multiple network units. Some or all of the components may be selected according to actual needs to achieve the objective of the embodiments.

In addition, each functional unit in each embodiment of the present invention may be integrated into a processing unit or processor, or each unit may exist separately and physically, or two or more components may be integrated into one single integrated unit. The above mentioned integrated unit may be implemented in the form of hardware or software functional unit.

If the integrated unit is implemented in the form of a software functional unit that the integrated unit is sold or used as an independent product, it may be stored in a computer-readable storage medium. According to the above mentioned embodiments of the present invention, the methods can be completed by a computer program instructing related hardware. The computer program may be stored in a computer-readable storage medium. When the computer program is executed by the processor, the steps of the above mentioned embodiments can be implemented. The computer program includes computer program code, and the computer program code may be in form of source code, an object code, an executable file, or other intermediate forms. The computer-readable medium may include any entity or device capable of carrying the computer program code, a recording medium, a flash disk, a mobile hard disk, a magnetic storage disk, an optical readable storage disk, such as CD or DVD, a computer memory, a read-only memory (ROM), Random Access Memory (RAM), electric carrier signals, telecommunication signals, and software distribution media. It should be understood that the content contained in the computer-readable medium can be appropriately increased or decreased according to the requirements of legislation and patent practice in the jurisdictions. For example, in some jurisdictions, the computer-readable medium may not include electric carrier signals and telecommunication signals.

The present invention, while illustrated and described in terms of a preferred embodiment and several alternatives, is not limited to the particular description contained in this specification. Additional alternative or equivalent components could also be used to practice the present invention.

What is claimed is:

1. An air purification method by an air purifier, comprising the steps of:
   (1) storing an identification information of the air purifier and an associated identification information of an automated floor cleaner;
   (2) acquiring air quality data within an air purifying area by an air quality detection sensor provided in the automated floor cleaner while mandatorily vacuum cleaning the air purifying area by the automated floor cleaner;
   (3) determining whether the air quality data falls within a predetermined threshold range, wherein the threshold range is preset in the air purifier;
   (4) configuring the operation mode of the air purifier as a stationary purification mode when the area size of the air purifying area is smaller than the coverage area of the air purifier; and configuring the operation mode of the air purifier as a mobile purification mode when the area size of the air purifying area is equal to or greater than the coverage area of the air purifier, said automated floor cleaner being operated to move within said air purifying area so as to collect said air quality data;
   (5) acquiring position information of the air purifier and an electronic map data created by the automated floor cleaner;
   (6) controllably moving the air purifier at the air purifying area according to the position information of the air purifier and the electronic map data of the automated floor cleaner; and
   (7) controlling the air purifier to follow the automated floor cleaner to move at the air purifying area; and
   (8) controlling the air purifier in response to the operation mode thereof to purify air within the air purifying area by acquiring a moving path of the automated floor cleaner, and controlling the air purifier to move at the air purifying area according to the moving path the automated floor cleaner when the mobile purification mode of the air purifier is determined.

2. The method, as recited in claim 1, after the step (8), further comprising the steps of:
   acquiring a data of cleaning sequence in the air purifying area by the automated floor cleaner; and
   controlling the air purifier to purify the air at a remaining area of the air purifying area in response to the cleaning sequence of the automated floor cleaner.

3. The method, as recited in claim 1, after the step (8), further comprising a step of controlling the air purifier to return back to a charging station for charging.

4. An air purifier, comprising: a memory, a processor, and a computer program stored on the memory and executable on the processor to perform operations comprising:
   (1) storing an identification information of the air purifier and an associated identification information of an automated floor cleaner;
   (2) acquiring air quality data within an air purifying area by an air quality detection sensor provided in the automated floor cleaner while mandatorily vacuum cleaning the air purifying area by the automated floor cleaner;
   (3) determining whether the air quality data falls within a predetermined threshold range, wherein the threshold range is preset in the air purifier;
   (4) configuring the operation mode of the air purifier as a stationary purification mode when the area size of the air purifying area is smaller than the coverage area of the air purifier; and configuring the operation mode of the air purifier as a mobile purification mode when the area size of the air purifying area is equal to or greater than the coverage area of the air purifier, said automated floor cleaner being operated to move within said air purifying area so as to collect said air quality data;
   (5) acquiring position information of the air purifier and an electronic map data created by the automated floor cleaner;
   (6) controllably moving the air purifier at the air purifying area according to the position information of the air purifier and the electronic map data of the automated floor cleaner; and
   (7) controlling the air purifier in response to the operation mode thereof to purify air within the air purifying area, wherein the computer program stored on the memory and executable on the processor to further perform at least one of the operations comprising:
   controlling the air purifier to follow the automated floor cleaner to move at the air purifying area;
   controlling the air purifier to move at the air purifying area according to a moving path the automated floor cleaner after the moving path of the automated floor cleaner is acquired by the air purifier; and
   controllably moving the air purifier at the air purifying area according to the position information of the air purifier and the electronic map data of the automated floor cleaner.

5. The air purifier, as recited in claim 4, further comprising a communication module communicating to an automated floor cleaner to acquire an electronic map data created by the automated floor cleaner, wherein an identification information of the air purifier and an associated identification information of an automated floor cleaner are stored in the memory.

6. A computer-readable storage medium for an air purifier, comprising a memory storing a computer program, wherein the computer program is implemented by a processor to perform operations comprising:
- (1) storing an identification information of the air purifier and an associated identification information of an automated floor cleaner;
- (2) acquiring air quality data within an air purifying area by an air quality detection sensor provided in the automated floor cleaner while mandatorily vacuum cleaning the air purifying area by the automated floor cleaner;
- (3) determining whether the air quality data falls within a predetermined threshold range, wherein the threshold range is preset in the air purifier;
- (4) configuring the operation mode of the air purifier as a stationary purification mode when the area size of the air purifying area is smaller than the coverage area of the air purifier; and configuring the operation mode of the air purifier as a mobile purification mode when the area size of the air purifying area is equal to or greater than the coverage area of the air purifier, said automated floor cleaner being operated to move within said air purifying area so as to collect said air quality data;
- (5) acquiring position information of the air purifier and an electronic map data created by the automated floor cleaner;
- (6) controllably moving the air purifier at the air purifying area according to the position information of the air purifier and the electronic map data of the automated floor cleaner; and
- (7) controlling the air purifier in response to the operation mode thereof to purify air within the air purifying area.

* * * * *